Sept. 17, 1935.　　　R. C. SEYFORTH　　　2,014,816
COMPRESSOR
Filed Feb. 19, 1934　　　2 Sheets-Sheet 2
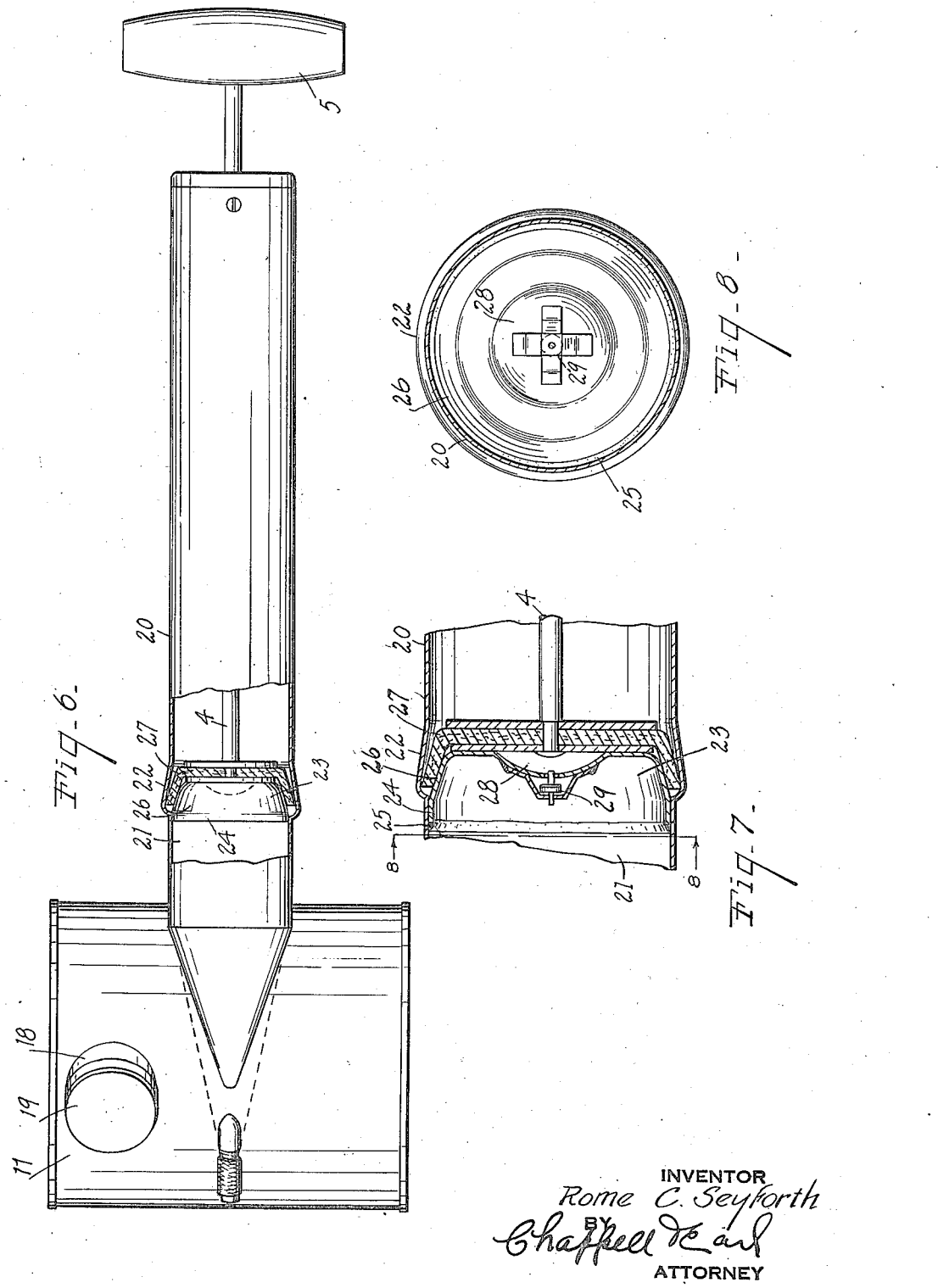
INVENTOR
Rome C. Seyforth
BY
Chappell Earl
ATTORNEY Patented Sept. 17, 1935

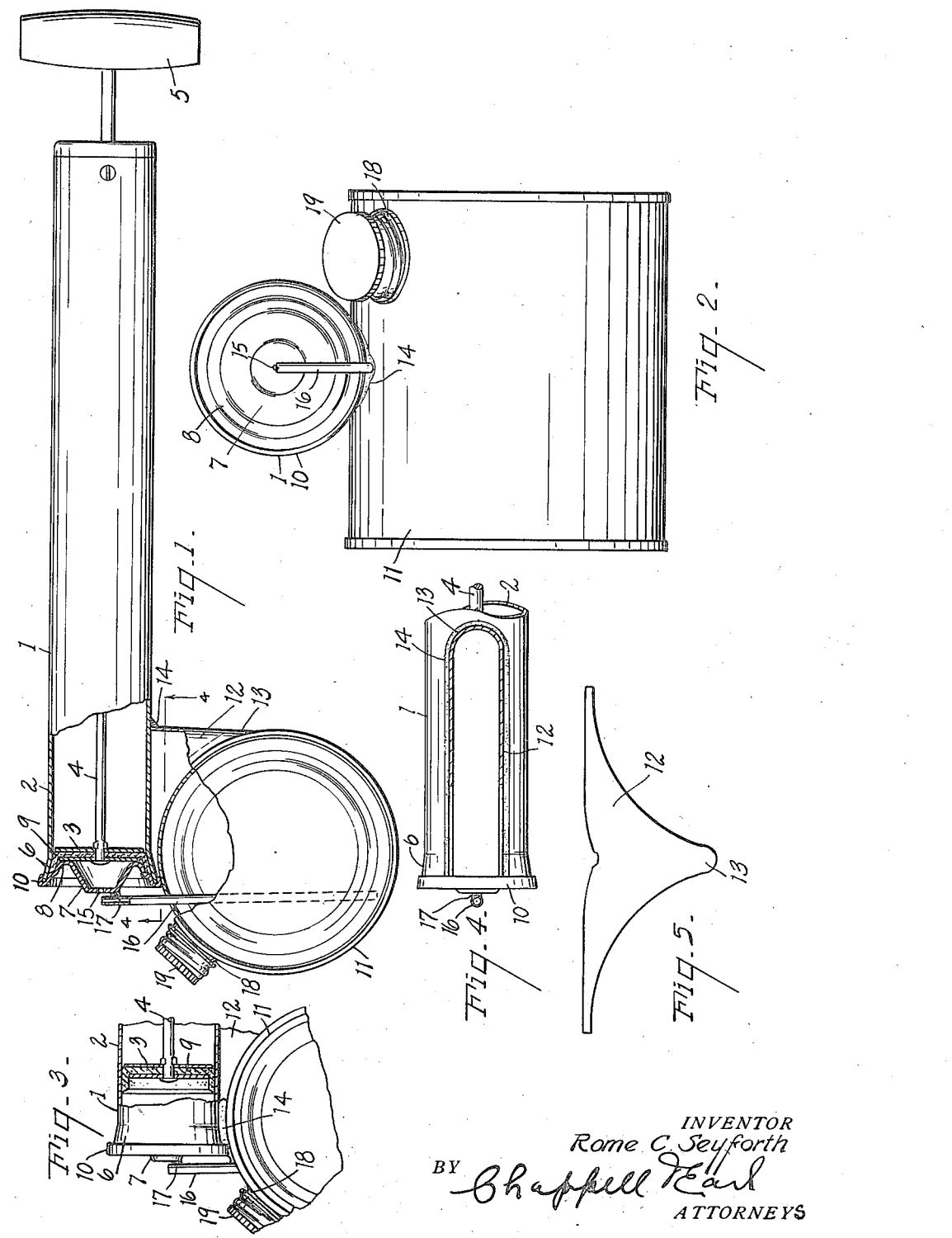

2,014,816

UNITED STATES PATENT OFFICE 2,014,816

COMPRESSOR

Rome C. Seyforth, Lowell, Mich., assignor to Lowell Manufacturing Company, Lowell, Mich.

Application February 19, 1934, Serial No. 711,945

8 Claims. (Cl. 230—238)

The main object of this invention is to provide a compressor of improved construction which is simple and economical in its parts and very effective and efficient in operation.

Another object of the invention is to provide means in a compressor of this character for normally holding a cup-like plunger packing or washer in expanded position when the plunger is at or nears the end of the compression stroke.

Objects relating to details and economies of my invention will appear from the description to follow. The invention is defined and pointed out in the claims.

A structure which is a preferred embodiment of my invention is illustrated in the accompanying drawings, in which:

Fig. 1 is a view mainly in side elevation of a sprayer embodying the features of my invention, parts being broken away and shown in vertical longitudinal section.

Fig. 2 is an enlarged front elevation.

Fig. 3 is a fragmentary view similar to Fig. 1, showing the plunger in an intermediate position.

Fig. 4 is an enlarged fragmentary section on a line corresponding to line 4—4 of Fig. 1.

Fig. 5 is a plan view of the sheet metal saddle or connecting member in the flat.

Fig. 6 is a top plan view of a modification, parts of the compressor being broken away and shown in horizontal longitudinal section.

Fig. 7 is an enlarged fragmentary section of the modification.

Fig. 8 is a transverse section on line 8—8 of Fig. 7.

In the embodiment of my invention illustrated by Figs. 1 to 5, inclusive, of the drawings, numeral 1 in general indicates a sprayer comprising a pump having a sheet metal cylinder 2 and a plunger 3 provided with a plunger rod 4 having a handle 5.

The cylinder 2 is provided with a flange 6 at its outer or head end, the flange being flared outwardly as shown. The head 7 has a flared rim portion 8 disposed concentrically within the cylinder and providing an annular outwardly flared recess or socket receiving the rim portion of the plunger packing 9. The head has a seam flange 10 at its outer end folded over the end of the cylinder and soldered or brazed thereto to provide a tight joint.

With this provision, the cup packing or gasket 9 is expanded into the recess when the plunger is at or approaches the end of its in or compression stroke, thereby normally maintaining the packing in expanded position so that when it is drawn into the cylinder on the out-stroke of the plunger an effective sealing contact is had with the cylinder wall which is maintained throughout the life of the packing. This insures a much more effective sealing engagement of the packing with the cylinder wall than is possible with the common construction wherein the packing is normally held in collapsed position by the wall of the cylinder.

When it is in its inner position, the plunger engages the head within the packing so that there is no strain on the packing. This avoids the necessity for stops on the plunger rod 4 and is a highly desirable feature of my invention.

The cylindrical sheet metal receptacle or container 11 is arranged under the cylinder 2 adjacent its discharge end with the axis of the receptacle at substantially right angles to that of the cylinder. The receptacle and pump cylinder are held in unitary assembled relation by means of the sheet metal saddle or connecting member 12 which is shaped to fit between the cylinder and receptacle when folded upon itself to provide a vertical channel having its web 13 tangentially disposed at the rear of the receptacle. The parts are integrally united at their lines of contact by the solder 14. This arrangement provides a very rigid construction and one in which it is not necessary to cut or distort the receptacle, and further, full capacity of the receptacle is retained which is not the case where the receptacle is depressed to form a recess for the cylinder as is quite a common practice.

The head 7 is provided with a central outlet port 15 for coaction with the upper end of the atomizing tube 16 which is soldered to the head at 17 and depends into the receptacle 11 as shown. The receptacle is provided with a suitable filling inlet neck 18 having a threaded closure cap 19. The compressor is operated by reciprocating the plunger in the cylinder.

In Figs. 6 to 8, inclusive, of the drawings, I illustrate my improvements as embodied in a sprayer in which the pump has a sheet metal cylinder 20 conformed to provide a compressed air chamber 21 adjacent its delivery end and a flared wall 22 merging into the wall thereof. The sheet metal cup-like partition 23 provides a combined end wall for the pressure chamber and head for the pump cylinder. The rim 24 of the partition fits within the wall of the air chamber and is suitably secured thereto as by solder 25. The side wall 26 of the partition is inclined opposite the flared portion 22 of the cylinder as shown to expand the cup packing 27 outwardly into the flared portion of the cylinder as the plunger approaches the end of its compression stroke.

In a cylinder structure of this character, the plunger packing is always held in expanded position when the plunger is at the end of its compression stroke. The plunger abuts the inner end of the flange cylinder head which serves as a stop and there is no necessity for a stop on the plunger rod and the packing is not deformed by coming in contact with the end of the cylinder.

The partition 23 has a central concavity 28 facing the pump cylinder which is provided with the valve 29 so that the pressure of the air within the chamber 21 can be built up by reciprocating the plunger. Thus, the compressor sprays continuously regardless of the position of the plunger within the cylinder.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a sprayer, the combination of a pump having a sheet metal cylinder conformed to provide a compressed air chamber adjacent its end and a flared wall merging into the wall thereof, a combined end wall for said air chamber and head for said cylinder comprising a sheet metal cup-like partition having its rim fitting and secured within said air chamber wall and its side wall inclined opposite said flared wall, said partition having a central concavity facing the pump cylinder and provided with a valve, and a plunger provided with a cup packing adapted to be expanded outwardly by the inclined side wall of said partition into the flared portion of said cylinder as the plunger approaches the end of its compression stroke.

2. In a sprayer, the combination of a pump having a cylinder conformed to provide a compressed air chamber adjacent its end and a flared wall merging into the wall thereof, a combined end wall for said air chamber and head for said cylinder comprising a cup-like partition having its rim fitting and secured within said air chamber wall and its side wall inclined opposite said flared wall, and a plunger provided with a cup packing adapted to be expanded outwardly by the inclined side wall of said partition into the flared portion of said cylinder as the plunger approaches the end of its compression stroke.

3. In a sprayer, the combination of a pump having a cylinder conformed to provide a compressed air chamber adjacent its end and a flared wall merging into the wall thereof, a cup-like partition having its side wall inclined opposite said flared wall, said partition having a central valved concavity facing the pump cylinder, and a plunger provided with a cup packing adapted to be expanded outwardly by the inclined side wall of said partition into the flared portion of said cylinder as the plunger approaches the end of its compression stroke.

4. In a compressor, the combination of a cylinder conformed to provide a compressed air chamber adjacent its end and a flared wall portion merging into the wall thereof, a cup-like partition having its side wall inclined opposite said flared wall, said partition having a central valved concavity facing the pump cylinder, and a plunger provided with a cup-like packing the rim of which is adapted to be expanded outwardly by the inclined side wall of said partition into the flared wall portion of said cylinder as the plunger approaches the end of its compression stroke.

5. In a compressor, the combination of a cylinder conformed to provide a compressed air chamber adjacent its end and a flared wall portion merging into the wall thereof, a cup-like partition having its side wall inclined opposite said flared wall, and a plunger provided with a cup-like packing the rim of which is adapted to be expanded outwardly by the inclined side wall of said partition into the flared wall portion of said cylinder as the plunger approaches the end of its compression stroke.

6. In a compressor, the combination of a cylinder conformed to provide adjacent its end a flared wall portion, a cup-like end member having its side wall inclined opposite said flared wall, and a plunger provided with a cup-like packing the rim of which is adapted to be expanded outwardly by the inclined side wall of said end member into the flared wall portion of said cylinder as the plunger approaches the end of its compression stroke.

7. The combination with a piston having a cup-like packing, of a cylinder conformed to provide a flared wall portion adjacent its end, and a cup-like end member conformed to provide a conical side wall inclined opposite said flared wall and having its edge spun over the flared end thereof, the conical side wall of said end member acting to expand the rim of said cup-like packing outwardly into the flared wall portion of the cylinder as the piston approaches the end of its stroke.

8. The combination with a piston having a cup-like packing, of a sheet metal cylinder having a flared wall portion at its end, a cup-like sheet metal end member having a flared wall portion coacting with said flared wall portion to provide a smooth-walled expanding chamber for the rim of said packing, the outer peripheral ends of said wall portions being interconnected to secure the end member and cylinder in fixed assembled relation.

ROME C. SEYFORTH.